(12) United States Patent  
Winker

(10) Patent No.: US 7,097,402 B2  
(45) Date of Patent: Aug. 29, 2006

(54) LOCK NUT

(75) Inventor: Alexander Winker, Spaichingen (DE)

(73) Assignee: Metallwarenfabrik Hermann Winker GmbH & Co. KG, Spaichingen (DE)

( * ) Notice: Subject to any disclaimer, the term of this patent is extended or adjusted under 35 U.S.C. 154(b) by 0 days.

(21) Appl. No.: 10/222,709

(22) Filed: Aug. 16, 2002

(65) Prior Publication Data

US 2003/0082028 A1    May 1, 2003

(30) Foreign Application Priority Data

Oct. 31, 2001  (DE) .......................... 201 17 635 U

(51) Int. Cl.
*F16B 39/32* (2006.01)
*F16B 31/00* (2006.01)
*F16B 33/04* (2006.01)

(52) U.S. Cl. ................... 411/114; 411/115; 411/7; 411/329; 411/951; 411/962

(58) Field of Classification Search ............. 411/114, 411/115, 299, 141, 182, 427, 949, 962, 963, 411/7, 950, 329, 951, 180
See application file for complete search history.

(56) References Cited

U.S. PATENT DOCUMENTS

| 1,020,668 | A | * | 3/1912 | Thompson | 411/204 |
| 1,226,143 | A | * | 5/1917 | Stubblefield | 411/329 |
| 2,055,443 | A | * | 9/1936 | Jones | 411/182 X |
| 3,425,314 | A | * | 2/1969 | Ohlson | 411/7 |
| 3,969,974 | A | * | 7/1976 | Lejdegard | 411/405 |
| 4,055,208 | A | * | 10/1977 | Blaul | 411/134 |
| 4,743,152 | A | * | 5/1988 | Nakayama et al. | 411/182 |
| 4,749,318 | A | * | 6/1988 | Bredal | 411/180 |
| 4,900,209 | A | * | 2/1990 | Reynolds | 411/182 X |
| 5,302,066 | A | * | 4/1994 | Bieschke et al. | 411/181 |
| 5,499,893 | A | * | 3/1996 | Thurston et al. | 411/282 |
| 6,010,289 | A | * | 1/2000 | DiStasio et al. | 411/174 |
| 6,095,735 | A | * | 8/2000 | Weinstein et al. | 411/221 |
| 6,227,782 | B1 | * | 5/2001 | Bowling et al. | 411/114 |
| 6,679,663 | B1 | * | 1/2004 | DiStasio et al. | 411/329 |

FOREIGN PATENT DOCUMENTS

| DE | 4231320 A1 | | 3/1994 | |
| DE | 4327461 A1 | | 10/1994 | |
| EP | 0825354 A2 | | 2/1998 | |
| GB | 13369 | * | 6/1909 | 411/141 |
| SU | 0562678 | * | 6/1966 | |
| SU | 562678 | * | 6/1977 | 411/7 |
| WO | WO 85/01552 | * | 4/1985 | |
| WO | WO 94/07040 | | 3/1994 | |

* cited by examiner

*Primary Examiner*—Katherine Mitchell
(74) *Attorney, Agent, or Firm*—Kriegsman & Kriegsman

(57) ABSTRACT

A lock nut comprising a solid nut body having a flange, from which a neck projection extends axially, being provided at its end surface with an annular shroud, from which at least two claws extend radially.

9 Claims, 1 Drawing Sheet

LOCK NUT

BACKGROUND OF THE INVENTION

The present invention concerns a lock nut (1) for a bearing, especially a wheel bearing of vehicles, wherein the bearing has a universal shaft which introduces the torque across a splining, and a flange, which is axially fastened to the universal shaft by a screw connection.

A nut of this kind is known from DE 195 43 436 C2. This document discloses a sleevelike threaded nut, which is used on a universal shaft of motor vehicle wheels to secure a wheel flange in a wheel bearing. In this case, the sleevelike threaded nut is screwed onto a threaded journal formed on the universal shaft and its axially resilient clamping flange lies against the wheel flange with prestress. The clamping flange passes into a hexagonal recess, which serves to fasten the threaded nut onto the threaded journal of the shaft. Notches are provided at the outer circumference of the threaded portion of the nut, which engage in a splining to secure the threaded nut, transferring the torque from the universal shaft to the wheel flange. In any case, the prestressing force of the bearing is produced by forming the inner end of the hub shaft provided on the wheel flange radially outward into a bead, which thrusts against the roller bearing races that are shoved onto the hub shaft, as is also described in patent DE 4,339,847 C1. This kind of nut serves only as a captive device with slight clamping force, so that the described configuration as a sheet metal part is sufficient.

Practice has shown that the familiar sleevelike threaded nut does not meet the requirements for the clamping force, due to the constantly occurring load changes at the wheel bearing, especially when braking and accelerating the vehicle in curves. The clamping force of this threaded nut produced as a deep-drawn sheet metal part can slacken considerably, which is not acceptable for safety reasons. Furthermore, because of the flexible design of the clamping flange of the sleevelike threaded nut, moisture cannot be reliably prevented from getting into the region of the splining. Thus, the splining may become corroded, so that a reliable transmission of the torque is no longer guaranteed.

The tooling expenses and the production costs are considerable for the sleevelike threaded nut manufactured as a deep-drawn part.

SUMMARY OF THE INVENTION

The object of the present invention now consists in furnishing a lock nut which permanently withstands the high loads, such as the high requirements when operating a vehicle, and which reliably prevents moisture from getting inside the bearing. Furthermore, the lock nut should be simple in design and economical to produce.

The solution consists in a lock nut with the features of patent claim 1. The lock nut according to the invention is characterized in that it consists of a solid nut body, having a flange, from which a neck projection extends axially, being provided at its end surface with an annular shroud, from which at least two claws extend radially.

This configuration of the invention has the effect that, due to the high strength of the nut body, the lock nut can be tightened much more firmly, so that the clamping force is considerably increased. This means that the axial tension between a universal shaft and the flange is so great that the bearing functions reliably over the long term, even under heavy load, such as rough driving conditions in the case of a wheel bearing, and no looseness occurs. Furthermore, the structure is pressed together so firmly that moisture is prevented from getting into a splining. Thanks to the simple construction of the lock nut of the invention, its production is cost-effective. The invented design also makes it possible to produce and maintain the required bearing prestressing force for the axial clamping between universal shaft and flange, if the bearing design so requires. An economical fabrication is achieved in particular by the fact that the nut body is a hot or cold pressed part.

Specifically, the lock nut according to the invention is configured such that the flange in relation to the neck projection has a much larger outer diameter, which is preferably in the ratio of 2:1. Furthermore, the flange is provided on its lateral surface with a toothing to engage with an installation tool. This toothing can be hexagonal or preferably twelve-point. In this way, a large torque can be exerted by an installation tool on the lock nut, resulting in a firm seating of the same on the universal shaft. At the same time, a reliable fastening of the universal shaft and the flange, as well as the roller bearing sitting on the hub connected to the flange, is achieved. The roller bearing is joined to a shock absorber by means of screws.

The lock nut is provided with a central threaded borehole for screwing onto a threaded journal formed on the universal shaft.

To simplify the construction of the nut body and thus achieve an economical fabrication of the same, the outer diameter of the cylindrical neck projection and the outer diameter of the annular shroud are the same size. The claws are formed as lobes extending tangentially away from the annular shroud.

Thus, the present invention provides a lock nut which is simple and economical to produce, which can be screwed together and tightened with optimal force, and which is reliably protected against loosening and getting lost. Furthermore, the lock nut according to the invention can also be used with open bearings, i.e., it is also suitable to being mounted on a bearing. Preferably, the entire bearing prestressing force, which depending on the dimensions, amounts to 60 to 100 Kilo-Newtons, can be withstood by the lock nut. Thus, the invented lock nut can be used in a broad field of application.

BRIEF DESCRIPTION OF THE DRAWINGS

An example of embodiment of the present invention is explained more closely hereafter by means of the enclosed drawing. This shows.

DETAILED DESCRIPTION OF THE INVENTION

Figure 1:
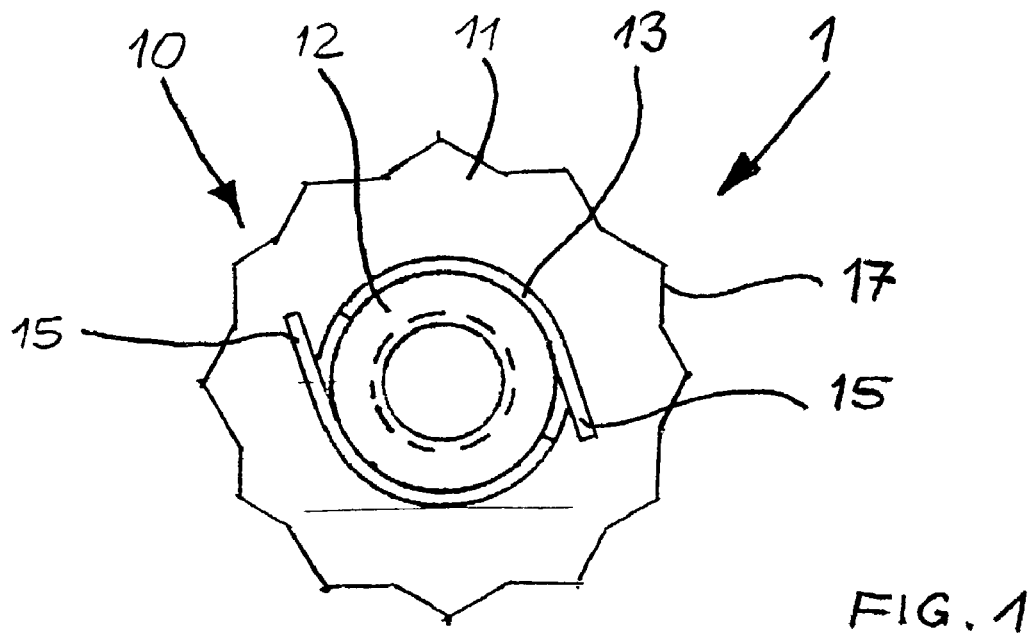
FIG. 1 a schematic, not dimensionally true representation of the invented lock nut in top view, and FIG. 2 a schematic, not dimensionally true representation of the lock nut of FIG. 1, in cross section.
Figure 2:
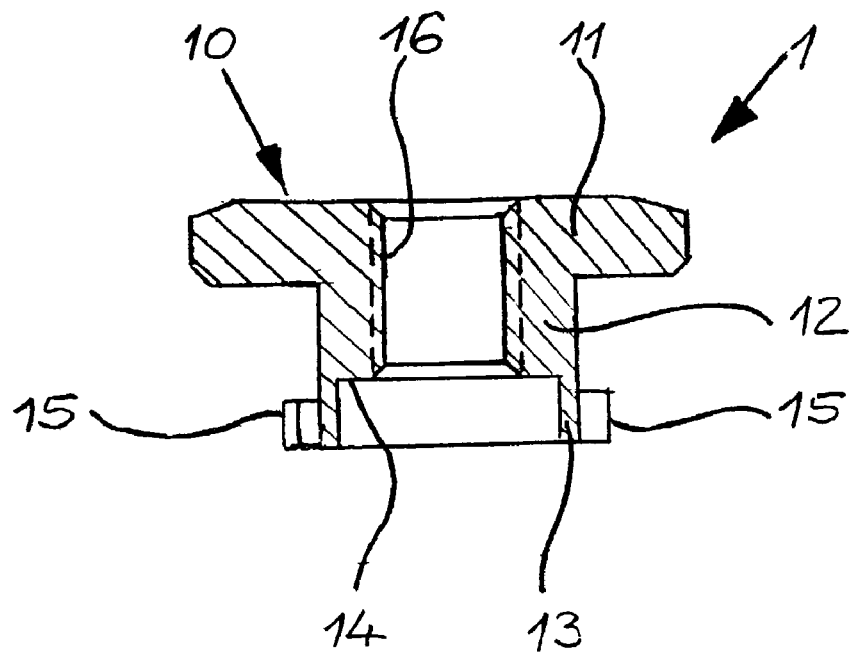

An example of embodiment of the invented lock nut is schematically depicted in FIGS. 1 and 2. The lock nut 1 consists of a nut body 10, which has a large flange 11. From the flange 11 there extends a neck projection 12 in axial direction. On the end surface 14 of the neck projection 12 is formed an annular shroud 13, which likewise extends in axial direction.

In the example of embodiment shown for the lock nut 1, the outer diameter of the neck projection 12 and the outer diameter of the annular shroud 13 are of the same dimension. Two opposite claws 15 are punched out from the annular shroud 13 and bent radially outward.

In a preferred embodiment, these claws 15 may engage with the splining formed between the flange and the universal shaft to secure the lock nut 1. In the example of embodiment, the claws 15 are configured as lobes extending tangentially away from the annular shroud 13. Any other suitable configuration and arrangement for the claws 15 is also conceivable.

For screwing together and achieving optimal clamping force, the lateral surface of the flange 11 is provided with a toothing 17, which can engage with an installation tool. The toothing 17 can be hexagonal, or also twelve-point, as in the example of embodiment.

With the invented lock nut 1, a reliable and secure fastening of a flange onto a universal shaft, such as a wheel flange, as described in patent DE 195 43 436 C2, is possible under cost-effective conditions. At the same time, the invented lock nut 1 keeps moisture out from the inside of the bearing. Furthermore, with the invented lock nut the required bearing prestressing force can be produced and maintained, if the bearing design requires such in the particular application.

The invention claimed is:

1. A lock nut for vehicles, characterized in that the lock nut consists of a solid nut body, said solid nut body comprising a flange, a neck projection extending axially from said flange, an annular shroud being provided at an end surface of said neck projection, said annular shroud having an annular surface and a central axis, at least two claws extending, in their entirety, radially outward, away from said central axis of said annular shroud and being tangential to said annular surface.

2. A lock nut according to claim 1, further characterized in that the nut body is a hot or cold pressed part.

3. A lock nut according to claim 1, further characterized in that the flange has an outer diameter that is larger than that of the neck projection in the ratio of 2:1, respectively.

4. A lock nut according to claim 1, further characterized in that the nut body is provided with a central threaded borehole.

5. A lock nut according to claim 1, further characterized in that the neck projection is cylindrical and has an outer diameter that is equal to the outer diameter of the annular shroud.

6. A lock nut according to claim 1, further characterized in that the claws are fashioned as lobes.

7. A lock nut according to one of claims 1 to 6, further characterized in that the flange on its lateral surface is provided with a toothing for engaging with an installation tool.

8. A lock nut according to claim 7, further characterized in that the toothing has a twelve-point configuration.

9. A lock nut according to claim 7, further characterized in that the toothing is of hexagonal configuration.

* * * * *